United States Patent
Chen et al.

(10) Patent No.: US 11,276,416 B2
(45) Date of Patent: Mar. 15, 2022

(54) METHOD, SYSTEM AND STORAGE MEDIUM FOR SOLVING ECHO CANCELLATION FAILURE

(71) Applicant: SHENZHEN TCL NEW TECHNOLOGY CO., LTD., Shenzhen (CN)

(72) Inventors: Wenjie Chen, Shenzhen (CN); Wenling Zhao, Shenzhen (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 289 days.

(21) Appl. No.: 16/494,767

(22) PCT Filed: Oct. 19, 2018

(86) PCT No.: PCT/CN2018/111059
§ 371 (c)(1),
(2) Date: Sep. 17, 2019

(87) PCT Pub. No.: WO2019/128402
PCT Pub. Date: Jul. 4, 2019

(65) Prior Publication Data
US 2020/0035255 A1 Jan. 30, 2020

(30) Foreign Application Priority Data
Dec. 26, 2017 (CN) .......................... 201711435157.7

(51) Int. Cl.
*G10L 21/00* (2013.01)
*G10L 21/0216* (2013.01)
(Continued)

(52) U.S. Cl.
CPC ........ *G10L 21/0216* (2013.01); *G10L 21/034* (2013.01); *H04N 21/42203* (2013.01); *H04N 21/4852* (2013.01); *G10L 2021/02163* (2013.01)

(58) Field of Classification Search
CPC ....... G10L 2021/02082; G10L 21/0208; G10L 21/02; G10L 21/0216; G10L 2021/02161;
(Continued)

(56) References Cited

U.S. PATENT DOCUMENTS 6,009,385 A 12/1999 Summerfield
6,766,176 B1 7/2004 Gupta et al.
(Continued)

FOREIGN PATENT DOCUMENTS

CN 1314025 A 9/2001
CN 1798217 A 7/2006
(Continued)

OTHER PUBLICATIONS

V. D'Alto, A. Cremonesi, A. Casnati, L. Dassie and S. Dal Poz, "Video deghosting using adaptive echo-detecting IIR filters," in IEEE Transactions on Consumer Electronics, vol. 39, No. 4, pp. 754-764, Nov. 1993, doi: 10.1109/30.267395. (Year: 1993).*
(Continued)

*Primary Examiner* — Edgar X Guerra-Erazo
(74) *Attorney, Agent, or Firm* — Nathan & Associates; Menachem Nathan (57) ABSTRACT

A method, system and storage medium for solving echo cancellation failure; method comprises: starting echo cancellation algorithm for convergence of self-adapting filter to stabilize coefficient of filter function (S100); presetting maximum amplitude value for signal intensity that microphone can receive, and detecting if microphone signal lower than maximum amplitude value (S200); prompting user or
(Continued)

television system automatically to turn down television volume when microphone received signal larger than or equal to maximum amplitude value, to ensure microphone received signal intensity lower than maximum amplitude value (S300); echo cancellation being carried out without distortion of signals, wherein coefficient of self-adapting filter function W(n) may be continually kept stable, avoiding self-adapting filter converging multiple times due to signal distortion (S400). Method effectively solves problem of echo cancellation of self-adapting filter failing caused by multiple convergences due to clipping distortion of microphone signal.

15 Claims, 3 Drawing Sheets

(51) Int. Cl.
   *G10L 21/034* (2013.01)
   *H04N 21/422* (2011.01)
   *H04N 21/485* (2011.01)

(58) Field of Classification Search
   CPC . G10L 2021/02163; G10L 2021/02165; G10L 2021/02166; G10L 2021/02168; G10L 21/0224; G10L 21/0272; G10L 21/028; G10L 21/0308; G10L 21/0316; G10L 21/0324; G10L 21/0332; G10L 21/034; G10L 21/0356; G10L 21/0364; G10L 21/04; G10L 21/055; H04M 3/00; H04M 3/002; H04M 3/40; H04N 21/42203; H04N 21/4852; H04N 3/00; H04N 5/00; H04N 5/911; H04N 5/91; H04N 7/00
   See application file for complete search history.

(56) References Cited

U.S. PATENT DOCUMENTS

| | | | | |
|---|---|---|---|---|
| 9,559,651 | B2* | 1/2017 | Baumgarte | H03G 3/20 |
| 9,659,571 | B2* | 5/2017 | Van Der Schaar | G10L 21/02 |
| 9,686,396 | B2* | 6/2017 | Zhao | H04N 21/8106 |
| 9,876,887 | B2* | 1/2018 | Zhao | H04N 21/8113 |
| 10,244,093 | B2* | 3/2019 | Zhao | H04N 21/42203 |
| 11,005,985 | B2* | 5/2021 | Zhao | H04M 1/72412 |
| 2005/0018862 | A1* | 1/2005 | Fisher | H04M 3/002 381/98 |
| 2006/0126822 | A1 | 6/2006 | Schmidt et al. | |
| 2009/0192793 | A1 | 7/2009 | Smith et al. | |
| 2013/0103396 | A1 | 4/2013 | Swanson et al. | |
| 2014/0126728 | A1* | 5/2014 | Van Der Schaar | H04R 29/00 381/56 |
| 2014/0162625 | A1* | 6/2014 | Zhao | H04N 21/42203 455/420 |
| 2017/0251091 | A1* | 8/2017 | Zhao | H04N 21/4852 |
| 2018/0124226 | A1* | 5/2018 | Zhao | H04N 21/4122 |
| 2019/0289111 | A1* | 9/2019 | Zhao | H04N 21/4222 |
| 2021/0258416 | A1* | 8/2021 | Zhao | H04N 21/4122 |

FOREIGN PATENT DOCUMENTS

| | | |
|---|---|---|
| CN | 1953060 A | 4/2007 |
| CN | 101669284 A | 3/2010 |
| CN | 103259563 A | 8/2013 |
| CN | 103475975 A | 12/2013 |
| CN | 203618113 U | 5/2014 |
| CN | 105225674 A | 1/2016 |
| CN | 106373603 A | 2/2017 |
| JP | 2001094479 A | 4/2001 |

OTHER PUBLICATIONS

P. Shah, I. Lewis, S. Grant and S. Angrignon, "Nonlinear acoustic echo cancellation using feedback," 2013 IEEE International Conference on Acoustics, Speech and Signal Processing, 2013, pp. 610-614, doi: 10.1109/ICASSP.2013.6637720. (Year: 2013).*

Ikram, M. Z. (May 2014). Non-linear acoustic echo cancellation using cascaded Kalman filtering. In 2014 IEEE International Conference on Acoustics, Speech and Signal Processing (ICASSP) (pp. 1320-1324). IEEE. (Year: 2014).*

Marquardt, L., Svaizer, P., Mabande, E., Brutti, A., Zieger, C., Omologo, M., & Kellermann, W. (Aug. 2009). A natural acoustic front-end for Interactive TV in the EU-Project DICIT. In 2009 IEEE Pacific Rim Conference on Communications, Computers and Signal Processing (pp. 894-899). IEEE. (Year: 2009).*

World Intellectual Property Organization (WIPO) International Search Report for PCT/CN2018/111059, dated Dec. 12, 2018 6 Pages.

Second Office Action with Search Report dated Apr. 13, 2021 from China Application No. 201711435157.7.

"DSP Embedded Application System Development Typical Example (C6000)" dated Nov. 30, 2005, China Electric Power Press, China.

Szabolcs P L et al: "Hands-Free VoIP Terminal with Gain Control Based on Neural Network", Engineering of Computer Based Systems(ECBS), 2012 IEEE 19th International Conference and Workshops on, IEEE, Apr. 11, 2012.

European Search Report dated Jun. 17, 2021 From the European Patent Office Re. Application No. EP18897772.2.

* cited by examiner

METHOD, SYSTEM AND STORAGE MEDIUM FOR SOLVING ECHO CANCELLATION FAILURE

CROSS-REFERENCE TO RELATED APPLICATIONS

This application is a national stage application of PCT Patent Application No. PCT/CN2018/111059, filed on Oct. 19, 2018, which claims priority of Chinese Patent application No. 201711435157.7, filed on Dec. 26, 2017, the entire content of all of which is incorporated herein by reference.

FIELD OF THE INVENTION

The present invention relates to a field of a smart television sound effect technology, and more particularly, to a method, system and storage medium for solving an echo cancellation failure.

BACKGROUND

Currently, an artificial intelligence has become a hot spot, as a part of the artificial intelligence, a speech recognition technology is also becoming more and more familiar to people. Under a market driving of a plurality of intelligent equipments including a smart audio and a smart TV, the speech recognition technology has become a synonymous of intelligence. Although the speech recognition technology in a field of the artificial intelligence has achieved a great progress in recent years, there are still a plurality of problems, especially when it is practically applied to a plurality of smart devices, there are still a plurality of specific usage problems. For example, when a smart TV is making a speech recognition, if a volume of the smart TV is turned up to a certain volume value, a speech recognition rate of the smart TV will be very low, and even turning the volume of the smart TV down again, during a long period of time, the speech recognition rate will still be pretty low. A main reason, from an analysis, is that, a signal captured by a microphone at a high volume has appeared a clipping distortion, which causes an echo cancellation algorithm to require a re-convergence, while a convergence process takes a certain time, and an echo cancellation effect is very poor during the convergence process, bringing a very bad experience to user.

Therefore, the current technology needs to be improved and developed.

BRIEF SUMMARY OF THE DISCLOSURE

According to a plurality of defects described above in the current technology, the present invention is providing a method for solving an echo cancellation failure caused by the clipping distortion, in order to solve a plurality of defects and deficiencies in the prior art, by presetting a maximum amplitude value for a signal intensity that a microphone is allowed to receive, when a signal intensity received by the microphone is greater than or equal to the amplitude value, a volume of the television is turned down to ensure that the signal intensity received by the microphone is less than the amplitude value, so that the echo cancellation is performed without the clipping distortion of the signal, avoiding the echo cancellation failure caused by a multiple convergence of a self-adapting filter due to the clipping distortion of the microphone signal.

In order to achieve the above mentioned goals, the technical solution of the present invention to solve the technical problems is as follows:

A method for solving an echo cancellation failure, applied to solving a problem of a television that an echo cancellation function failure in a certain period, caused by a clipping distortion of a microphone signal, wherein the method for solving the echo cancellation failure comprises a plurality of following steps:

A. starting an echo cancellation algorithm, and a self-adapting filter performing a convergence, to make a plurality of coefficients of a filter function to be stable;

B. presetting a maximum amplitude value for a microphone signal, and detecting if the microphone signal is lower than the maximum amplitude value;

C. turning down a volume of the television, and making the microphone signal smaller than the maximum amplitude value, when the microphone signal is larger than or equal to the maximum amplitude value;

D. performing an echo cancellation to the microphone signal by adopting the filter function in a stable state.

As a further improved technical solution, after starting the echo cancellation algorithm in the step A described above, the self-adapting filter requires a fast convergence, after the convergence is done, the coefficients of the self-adapting filter function tend to be stable, when an echo path is unchanged or a microphone signal does not appear a clipping distortion, the coefficients of the self-adapting filter function will remain stable; when the microphone signal has a clipping distortion, the self-adapting filter re-converges, by adjusting the coefficients of the filter function to adapt a filtering requirement under a new status, making the coefficients of the self-adapting filter function remain stable.

As a further improved technical solution, the step B described above comprises specifically a plurality of following steps:

detecting a sound intensity played by the television;

in combination with the sound intensity played by the television, presetting a maximum amplitude value of the signal intensity allowed by a microphone, to make a signal received by the microphone to be smaller than the maximum amplitude value.

As a further improved technical solution, in the step C described above, when the microphone signal is larger than or equal to the maximum amplitude value, a system turns down the volume automatically, making the signal that the microphone receives smaller than the maximum amplitude value, and ensuring that the echo cancellation is performing without any signal distortions, so as to avoid a multiple convergence.

As a further improved technical solution, in the step D described above, after the signal that the microphone receives is smaller than the maximum amplitude value without any distortions, performing the echo cancellation by adopting the filter function in a stable state, and without re-converging the self-adapting filter, thus when the volume of the television lowers down, the echo cancellation recovers.

The present invention further provides a system for solving the echo cancellation failure, applied to solve a problem of the echo cancellation function fails in a certain period, caused by the clipping distortion of the microphone signal, wherein the system comprises: an echo cancellation module, a microphone signal control module and a volume control module;

the echo cancellation module, configured to start the echo cancellation algorithm for the echo cancellation, converging the self-adapting filter, so as to make the coefficients of the filter function stable;

the microphone signal control module, configured to detect a signal intensity of the microphone, and deciding if the signal intensity that the microphone receives is larger than the maximum amplitude value preset;

the volume control module, configured to control the volume of the television, making the signal intensity that the microphone receives smaller than the maximum amplitude value;

when the microphone signal control module detects that the microphone signal is larger than the maximum amplitude value preset, the volume control module lowers the volume of the television, and makes the signal intensity that the microphone receives smaller than the maximum amplitude value, and the echo cancellation module performs the echo cancellation by adopting the filter function in a stable state.

As a further improved technical solution, a specific function of the echo cancellation module achieving the echo cancellation is as below:

after starting the echo cancellation algorithm, the self-adapting filter function requires a fast convergence, after the convergence is done, a coefficient of the self-adapting filter function approaches stable, when the echo path is unchanged or the microphone signal has no clipping distortion, making the coefficient of the self-adapting filter function keep stable; when the microphone signal appears a clipping distortion, the self-adapting filter re-converges, and adapts a filter requirement under a new state through adjusting the coefficient of the filter function, making the coefficient of the self-adapting filter function approaches stable keep stable.

As a further improved technical solution, the microphone signal control module comprises a plurality of following functions specifically:

presetting a maximum amplitude value of the signal intensity allowed to receive by the microphone, detecting the size of the voice that the television plays, when the microphone signal is larger than or equal to the maximum amplitude value, the volume control module is noticed to lower the volume of the television automatically, to ensure that the echo cancellation is processed without any signal clipping distortions.

As a further improved technical solution, the volume control module comprises a plurality of following functions specifically:

when the microphone signal control module detects that the microphone signal is larger than or equal to the maximum amplitude value preset of the microphone signal, the volume control module is then noticed, the volume control module controls lower the volume of the television, making the signal that the microphone received not exceed the maximum amplitude value, to ensure the echo cancellation module to execute the echo cancellation without any signal distortions.

The present invention further provides a storage medium, the storage medium has a program for solving the echo cancellation failure stored, when the program for solving the echo cancellation failure is executed by a processor, the steps of the above method for solving the echo cancellation failure are achieved.

Comparing to a case in the current technology that, when the volume of the smart television is larger than a certain value, the signal that the microphone receives will make a clipping distortion, that further makes the self-adapting filter converge multiple times, and affects the echo cancellations, the present invention presets a maximum amplitude value for a signal intensity that a microphone is allowed to receive, and adjusts the volume of the smart television, by real time monitoring the signal intensity that the microphone receives, to ensure the echo cancellation is achieved in a case that the signal the microphone receives is not larger than the maximum amplitude value, without any clipping distortions, thus it has avoided causing a problem that the self-adapting filter converges multiple times, making the coefficient of a self-adapting filter function $W(n)$ unstable, and affecting the echo cancellation.

DETAILED DESCRIPTION OF EMBODIMENTS

In order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

At present, both machine learning and artificial intelligence are hotspots in a field of technology, and a speech recognition technology, as a part of the artificial intelligence, is becoming more and more familiar. Especially driven by a plurality of smart devices including a smart stereo and a smart television, the speech recognition technology has become a synonymous of intelligence. Although the speech recognition technology has made great progresses in recent years, there are still some problems. In the smart television, it has found that when a sound played by the television is adjusted to a certain volume value, a speech recognition rate will be very low, and even if the volume is adjusted low again, in a long period of time, the speech recognition rate is still low. After an analysis, a main reason is found that a clipping distortion has occurred in the signal received by the microphone at a large volume, which causes an echo cancellation algorithm requiring a re-convergence, and a convergence process takes a certain amount of time, while an effect of the echo cancellation during this period of time is very poor.

Figure 4:
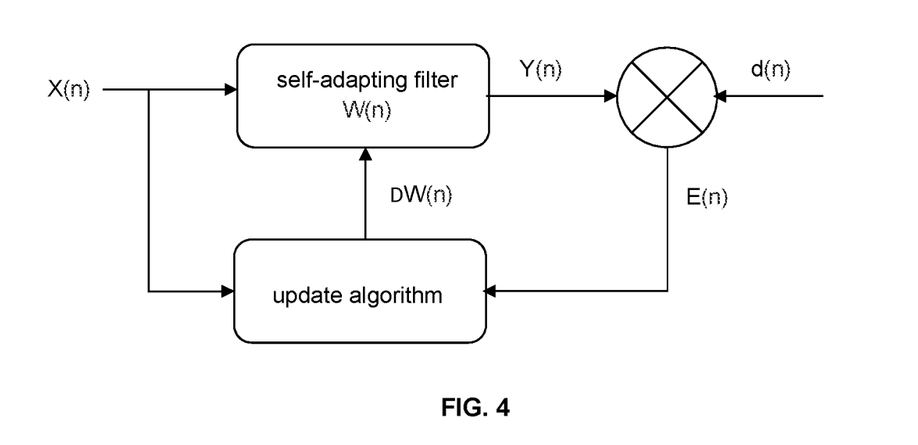
FIG. 4 illustrates a signal flow chart of a self-adapting filter in a discrete domain applied to simulating an unknown discrete system in the present invention.

A core content of the echo cancellation is a self-adapting filter, which is an algorithm or a device that adopts a certain algorithm and automatically adjusts a plurality of filter coefficients to achieve an optimal filtering characteristic, based on an estimation of a plurality of statistical characteristics of both input and output signals. The self-adapting filter can be in a continuous domain or a discrete domain. A discrete domain self-adapting filter consists of a set of mechanisms including a tap delay line, a variable weighting coefficient, and an automatically adjusting coefficient. FIG. 4 illustrates a signal flow chart of a self-adapting filter in a discrete domain applied to simulating an unknown discrete system in the present invention, the self-adapting filter updates and adjusts the variable weighting coefficient for each sample of an input signal sequence X(n) according to a specific algorithm, making a mean squared error minimum of an output signal sequence Y(n) compared to a desired signal sequence d(n), that is, the output signal sequence Y(n) approximates the desired signal sequence d(n), and an echo path function to be solved is a process of a self-adapting filter function W(n) converging. The input signal sequence X(n) applied is an echo reference signal, and the desired signal sequence d(n) is an echo signal received by the microphone, and the W(n) after the self-adapting filter converges is the echo path function. After converging, when an actual echo occurs, the echo reference signal is passed through the function W(n), and a very accurate echo signal will be got. Subtracting the echo signal from a mixed signal E(n) directly, and obtaining an actual voice signal ΔW(n) that needs to be sent, an echo cancellation task will be achieved.

Figure 5:
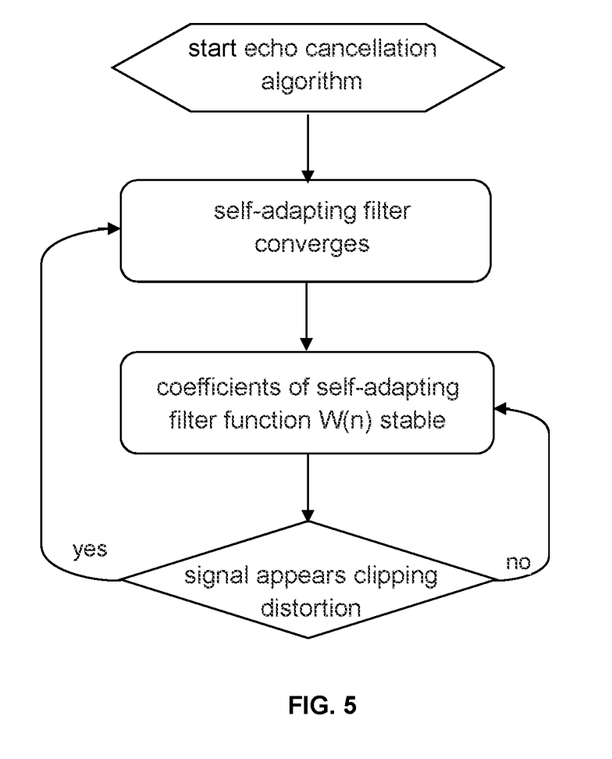
FIG. 5 illustrates a flow chart for an echo cancellation process in the current technology.

Shown as FIG. 5, a processing flow for the echo cancellation in the prior art is: after an echo cancellation algorithm starts, a self-adapting filter converges quickly, and after converged, the coefficient of the self-adapting filter function W(n) will tend to stable. As long as the echo path is unchanged or the microphone signal does not have a clipping distortion, the coefficient of the self-adapting filter function W(n) will remain stable. However, when a sound played by the television becomes larger, which causes the signal received by the microphone to have a clipping distortion, a self-adapting filtering needs to be re-converged, by adjusting the coefficient of the filter function W(n), a plurality of filtering requirements in a new state is adapted. While it takes a relatively long time to finish re-converging in such a state. Therefore, when a re-convergence occurs, even if a user turns down the volume of the television again, to make the signal received by the microphone not being clipped, in a short time, the echo cancellation function still cannot be restored to a normal working state.

Figure 1:
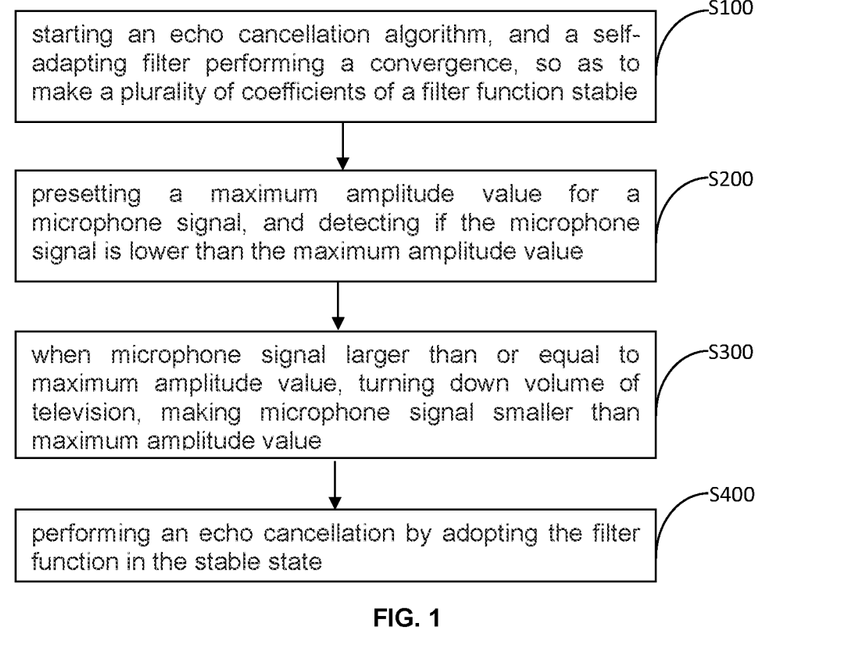
FIG. 1 illustrates a flow chart for a preferred embodiment of a method for solving the echo cancellation failure in the present invention.

According to a plurality of defects in the prior art, the present invention provides a method for solving an echo cancellation failure caused by the clipping distortion, a flow chart for a preferred embodiment of a method for solving the echo cancellation failure in the present invention is shown as FIG. 1, the preferred embodiment of the method in the present invention comprises a plurality of steps following:

Step S100, starting an echo cancellation algorithm, and a self-adapting filter performing a convergence, so as to make a plurality of coefficients of a filter function stable;

Specifically, in the present embodiment, after the echo cancellation algorithm being started, the self-adapting filter will converge fast. After the converging is finished, the coefficients of the self-adapting filter function W(n) will tend to be stable, as long as the echo path is unchanged or the microphone signal does not have a clipping distortion, the coefficient of the self-adapting filter function W(n) will be kept to be stable.

When the microphone signal has a clipping distortion, the self-adapting filter function requires a re-convergence, by adjusting the coefficient of the self-adapting filter function W(n), a filtering requirement in a new state is adapted, and in the new state, the re-convergence will require a relatively long time to finish, so as to keep the coefficient of the self-adapting filter function W(n) stable.

Step S200, presetting a maximum amplitude value for a microphone signal, and detecting if the microphone signal is lower than the maximum amplitude value;

Specifically, in the present embodiment, if the signal received by the microphone is too large, it is generally caused by an excessive sound played by the television itself. So presetting a maximum amplitude value for the microphone signal, before detecting and deciding an intensity of the sound played by the television, and making the signal that the microphone receives lower than the maximum amplitude value. By detecting the intensity of the sound played by the television, and combining with the intensity of the sound played by the television, the present step presets a maximum amplitude value for a signal intensity that the microphone is allowed to receive, so as to make the signal that the microphone receives smaller than the maximum amplitude value.

Step S300, when the microphone signal is larger than or equal to the maximum amplitude value, turning down a volume of the television, and making the microphone signal smaller than the maximum amplitude value;

Specifically, when the microphone signal is larger than or equal to the maximum amplitude value, a user is reminded to turn the volume lower, or, an option of "adjusting the volume automatically" is added into a system setting of the television, so as to allow the system turns the volume lower automatically, and making the signal that the microphone received smaller than the amplitude value, so as to make sure the echo cancellation is processed in a case of the signal having no distortions, and avoid a multiple convergence caused by the signal distortion.

Step S400, performing an echo cancellation to the microphone signal by adopting the filter function in the stable state before.

Specifically, in the present embodiment, when the microphone signal is smaller than the maximum amplitude value, and the signal has no distortions, the filter function in a stable state is still adopted for an echo cancellation, and the self-adapting filter needs no re-convergence. As long as the volume is lowered, the echo cancellation function recovers ASAP, without any disable period for the echo cancellation function.

Figure 2:
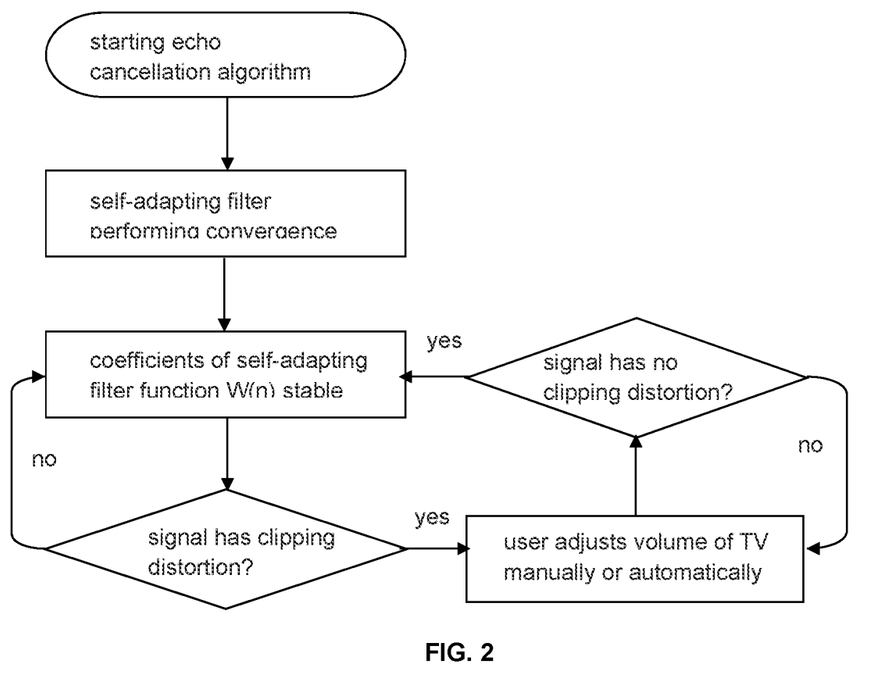
FIG. 2 illustrates a specific flow chart for a preferred embodiment of a method for solving the echo cancellation failure in the present invention.

In order to better explain a preferred embodiment for the method in the present invention, and to better understand a plurality of specific implementation steps of the preferred embodiment for the method in the present invention, a specific flow chart of a preferred embodiment for the method in the present invention is provided herein. Shown as FIG. 2, a specific flow chart for a preferred embodiment is illustrated. First, starting an echo cancellation algorithm for the echo cancellation, and a self-adapting filter performing a convergence, while a plurality of coefficients of a filter function is stable, then the microphone signal is decided to have a clipping distortion or not, if there is no clipping distortion appearing, then the coefficients of the self-adapting filter function W(n) keep stable, while a clipping distortion appears, the user adjusts the volume of the television manually or automatically by starting a system, and deciding if the microphone signal has the clipping distortion or not, after adjusting the volume, if the cupping distortion still appears, then the volume is adjusted continuously, if there is no more clipping distortion appears, then keeping the coefficients of the self-adapting filter function W(n) stable. By effectively monitoring the intensity of the signal received by the microphone and controlling the volume of the television, the signal recorded by the microphone does not have any clipping distortions, the coefficient of the self-adapting filter function W(n) is kept in a stable state, and the echo cancellation function is normal and effective.

Figure 3:
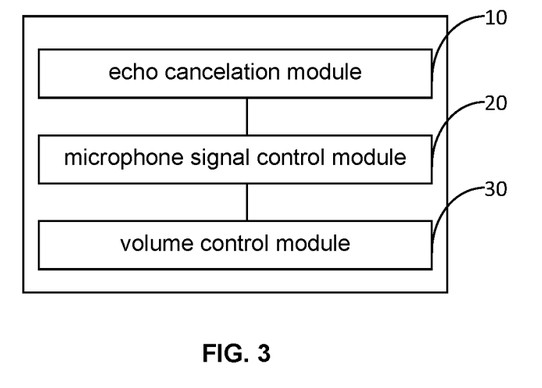
FIG. 3 illustrates a schematic diagram for a preferred embodiment of a system for solving the echo cancellation failure in the present invention.

The present invention further provides a system for solving the echo cancellation failure, applied to solving a problem that the echo cancellation function is disabled in a certain period, caused by the clipping distortion of the microphone signal. FIG. 3 illustrates a schematic diagram for a preferred embodiment of a system for solving the echo cancellation failure in the present invention, Shown as FIG. 3, the system comprises: an echo cancelation module 10, a microphone signal control module 20 and a volume control module 30.

The echo cancelation module 10 is applied to starting the echo cancellation algorithm for the echo cancellation, converging the self-adapting filter, so as to make the coefficients of the filter function stable;

Specifically, in the present embodiment, a specific function of the echo cancelation module achieving an echo cancelation task is as following: a core content of the echo cancelation is the self-adapting filter, a working principle of the self-adapting filter may refer to the working process of the self-adapting filter described above, and no more descriptions will be made here.

After starting the echo cancellation algorithm, the self-adapting filter makes a fast convergence, after the convergence is done, the coefficients of the self-adapting filter function W(n) tend to be stable, when the echo path is unchanged or the microphone signal does not appear a clipping distortion, the coefficients of the self-adapting filter function W(n) will keep remaining stable; when the voice of the television played increases, and makes the signal that the microphone received have a clipping distortion, the self-adapting filter will require a re-convergence, by adjusting the coefficients of the filter function W(n), to adapt a filtering requirement under a new status, while the re-convergence in the new status requires a relatively long time to finish, to make the coefficients of the self-adapting filter function W(n) remain stable.

The microphone signal control module 20 is applied to detecting the signal intensity of the microphone, and deciding if the signal intensity that the microphone receives is larger than the maximum amplitude value preset.

Specifically, in the present embodiment, the microphone signal control module 20 is applied to detecting the signal intensity of the microphone, and deciding if the signal intensity that the microphone receives is larger than the maximum amplitude value preset, the intensity of the signal that the microphone received is closely related to a size of the sound played by the television itself. Thus presetting a maximum amplitude value for the intensity of the signal that the microphone is allowed to receive, and when the microphone signal is larger than or equal to the maximum amplitude value, the volume of the television is lowered, to ensure the echo cancelation is processed without the signal distortion, so as to avoid a problem of the multiple convergence caused by the clipping distortion of the microphone signal, which affects the echo cancelation.

The volume control module 30 is applied to controlling the volume of the television, making the signal that the microphone receives smaller than the maximum amplitude value.

Specifically, in the present embodiment, the volume control module 30 is applied to controlling the volume of the television, making the signal that the microphone receives smaller than the maximum amplitude value, when the microphone signal control module 20 detects that the microphone signal is larger than or equal to the maximum amplitude value of the microphone signal preset, the volume control module 30 is noticed, and the volume control module 30 controls lower the volume of the television, makes the signal that the microphone received not exceed the maximum amplitude value, and ensures the echo cancelation module 10 is making the echo cancelation without any signal distortions.

The intensity of the signal that the microphone receives is closely related to the size of the voice that the television itself plays, when the signal that the microphone receives is larger than or equal to the maximum amplitude value preset, the volume of the television is required to be lower, while lowering the volume of the television comprises two methods, one is noticing the user to lower the volume of the television to a suitable volume value; another is adding a "adjusting the volume automatically" option into a system setting of the television, so the system will adjust the volume of the television to a suitable volume value automatically.

When the microphone signal control module 20 detects the signal that the microphone receives is larger than the maximum amplitude value preset, the volume control module 30 lowers the volume of the television, and makes the signal that the microphone receives smaller than the maximum amplitude value, which is achieved by the echo cancelation module 10 making the echo cancelation by adopting the filter function in the stable state. Other working principle may refer to the preferred embodiments of the method described above, and no more descriptions will be stated herein.

The present invention further provides a storage medium, the storage medium is a computer readable storage medium, the storage medium has a program for solving the echo cancellation failure stored, when the program for solving the echo cancellation failure is executed by a processor, the steps of the above method for solving the echo cancellation failure is achieved.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A method for solving an echo cancellation failure, applied to solving a problem of a television that an echo cancellation function failure caused by a clipping distortion of a microphone signal, wherein the method for solving the echo cancellation failure comprises a plurality of following steps:
    A. starting an echo cancellation algorithm, and a self-adapting filter performing a convergence, to make a plurality of coefficients of a filter function to be stable;
    B. presetting a maximum amplitude value for a microphone signal, and detecting if the microphone signal is lower than the maximum amplitude value;
    C. turning down a volume of the television, and making the microphone signal smaller than the maximum amplitude value, when the microphone signal is larger than or equal to the maximum amplitude value,
    D. performing an echo cancellation to the microphone signal by adopting the filter function in a stable state.

2. The method for solving an echo cancellation failure according to claim 1, wherein in the step A, after starting the echo cancellation algorithm, the self-adapting filter requires a fast convergence, after the convergence is done, the coefficients of the self-adapting filter function tend to be stable, when an echo path is unchanged or a microphone signal does not appear a clipping distortion, the coefficients of the self-adapting, filter function will remain stable; when the microphone signal has a clipping distortion, the self-adapting filter re-converges, by adjusting the coefficients of the filter function to adapt a filtering requirement under a new status, making the coefficients of the self-adapting filter function remain stable.

3. The method for solving an echo cancellation failure according to claim 1, wherein the step B comprises specifically a plurality of following steps:
  detecting a sound intensity played by the television;
  in combination with the sound intensity played by the television, presetting a maximum amplitude value of the signal intensity allowed by a microphone, to make a signal received by the microphone to be smaller than the maximum amplitude value.

4. The method for solving an echo cancellation failure according to claim 3, wherein in the step C, when the microphone signal is larger than or equal to the maximum amplitude value, turning down the volume automatically, making the signal that the microphone receives smaller than the maximum amplitude value, and ensuring that the echo cancellation is performing without any signal distortions, so as to avoid a multiple convergence.

5. The method for solving an echo cancellation failure according to claim 4, wherein in the step D, after the signal that the microphone receives is smaller than the maximum amplitude value without any distortions, performing the echo cancellation by adopting the filter function in a stable state, and without re-converging the self-adapting filter, thus when the volume of the television lowers down, the echo cancellation recovers.

6. A system for solving an echo cancellation failure, configured to solve a problem of the echo cancellation function failure in a certain period, caused by a clipping distortion of a microphone signal, wherein the system comprises:
  a memory storing computer-executable instructions; and
  a processor, when executing the computer-executable instructions, configured to:
  start an echo cancellation algorithm for an echo cancellation, converging a self-adapting filter, so as to make a plurality of coefficients of a filter function stable;
  detect a signal intensity of the microphone, and decide if the signal intensity that the microphone receives is larger than a maximum amplitude value preset;
  control a volume of the television, making the signal intensity that the microphone receives smaller than the maximum amplitude value;
  when the processor detects that the microphone signal is larger than the maximum amplitude value preset, the processor lowers the volume of the television, and makes the signal intensity that the microphone receives smaller than the maximum amplitude value, and the processor performs the echo cancellation by adopting the filter function in a stable state.

7. The system for solving the echo cancellation failure according to claim 6, wherein a specific function of the processor achieving the echo cancellation is further as below:
  after starting the echo cancellation algorithm, the self-adapting filter function requires a fast convergence, after the convergence is done, the coefficients of the self-adapting filter function approaches stable, when an echo path is unchanged or the microphone signal has no clipping distortion, making the coefficients of the self-adapting filter function keep stable; when the microphone signal appears a dipping distortion, the self-adapting filter re-converges, and adapts a filter requirement under a new state through adjusting the coefficients of the filter function, making the coefficients of the self-adapting filter function approaches stable keep stable.

8. The system for solving the echo cancellation failure according to claim 6, wherein the processor further comprises a plurality of following functions specifically:
  presetting a maximum amplitude value of the signal intensity allowed to receive by the microphone, detecting the size of the voice that the television plays, when the microphone signal is larger than or equal to the maximum amplitude value, the processor is noticed to lower the volume of the television automatically, to ensure that the echo cancellation is processed without any signal clipping distortions.

9. The system for solving the echo cancellation failure according to claim 8, wherein the processor further comprises a plurality of following functions specifically:
  when the processor detects that the microphone signal is larger than or equal to the maximum amplitude value preset of the microphone signal, the processor is then noticed, the processor controls lower the volume of the television, making the signal that the microphone received not exceed the maximum amplitude value, to ensure the processor to execute the echo cancellation without any signal distortions.

10. A non-transitory storage medium, wherein the non-transitory storage medium has a program for solving an echo cancellation failure stored, when the program for solving the echo cancellation failure is executed by a processor, the steps of the method for solving the echo cancellation failure are achieved according to claim 1.

11. The method for solving an echo cancellation failure according to claim 1, wherein in the step A, a plurality of steps of the self-adapting filter performing the convergence comprise: the self-adapting filter updates and adjusts a plurality of weighting coefficients for each sample of an input signal sequence, making an output signal sequence approximate a desired signal sequence, to solve an echo path function; wherein the input signal is an echo reference signal, the desired signal is an echo signal that the microphone received.

12. The method for solving an echo cancellation failure according to claim 1, wherein in the step C, turning down the volume of the television is achieved manually or automatically by starting a system.

13. The system for solving the echo cancellation failure according to claim 9, wherein the processor further comprises a plurality of following functions specifically:
  when the processor detects that the microphone signal is larger than the maximum amplitude value preset, the processor lowers the volume of the television, making the signal that the microphone received smaller than the maximum amplitude value, and the echo cancellation is processed by the processor adopting a filter function in a steady state.

14. The system for solving the echo cancellation failure according to claim 6, wherein converging the self-adapting filter comprises specifically: the self-adapting filter updates and adjusts a plurality of weighting coefficients for each sample of an input signal sequence, making an output signal sequence approximate a desired signal sequence, to solve an echo path function; wherein the input signal is an echo reference signal, the desired signal is an echo signal that the microphone received.

15. The system for solving the echo cancellation failure according to claim 6, wherein the processor lowers the volume of the television manually or automatically by starting a system.

\* \* \* \* \*